United States Patent Office

3,740,423
Patented June 19, 1973

3,740,423
**PROTECTION OF THE COLON OF MAMMALS DURING TREATMENT WITH ANTIBIOTICS BY SIMULTANEOUS ADMINISTRATION OF NYSTATIN AND *TORULOPSIS TROPSIS***
Pierre Roger Barbier, Paris, France, assignor to Societe d'Etudes Scientifiques et Industrielles de l'Ile-de-France, Paris, France
No Drawing. Continuation-in-part of application Ser. No. 873,685, Nov. 3, 1969, which is a continuation-in-part of application Ser. No. 631,852, Apr. 19, 1967, both now abandoned. This application Jan. 19, 1972, Ser. No. 219,139
Int. Cl. A61k 27/00
U.S. Cl. 424—93                                   2 Claims

ABSTRACT OF THE DISCLOSURE

The disadvantages of treatment of mammals with antibiotics—destruction of intestinal flora and consequent possibility of development of pathogenic yeasts latent in the colon—are avoided by administering, simultaneously with the said antibiotics, a mixture of Nystatin which destroys the pathogenic yeasts, and of *Torulopsis tropsis* which reinseminates the colon with sound flora.

This invention relates to the combination of Nystatin and *Torulopsis tropsis* which is the only yeast found to be resistant to Nystatin and to be non-pathogenic.

---

This application is a continuation-in-part application of the copending application Ser. No. 873,685, filed Nov. 3, 1969, now abandoned. The application Ser. No. 873,685 is a continuation-in-part of the application Ser. No. 631,852, filed Apr. 19, 1967, now abandoned.

It is well known that treatment of mammals with antibacterial antibiotics causes the destruction of the intestinal flora, except the pathogenic yeasts latent in the colon which are naurally resistant. The absence of competition between bacteria and yeasts allows the proliferation and consequently the increase in virulence of these pathogenic yeasts, especially the species Candida albicans. Possible manifestations of such virulence appear as colitis, stomatitis, cystitis and onyxis.

When administered during treatment of mammals with antibacterial antibiotics, Nystatin, because of its antifungal properties, destroys pathogenic and non pathogenic fungi contained in the colon. The sterilization of the non pathogenic fungi is avoided by simultaneously administering *Torulopsis tropsis* with the Nystatin. A sound flora of non pathogenic yeast results in the colon of the mammals, thereby furnishing significant amounts of B vitamins.

On administration of an antibiotic alone, intestinal bacteria and flora are destroyed, except for pathogenic fungi such as *Candida albicans* which proliferates and becomes virulent. But the administration of an antibiotic made simultaneously with the administration of Nystatin and *Torulopsis tropsis* destroys both the bacteria and flora in the intestinal tract and pathogenic fungi as well. At the same time, the *Torulopsis tropsis* reinseminates the colon without difficulty and without causing deleterious organic reactions. The following chart illustrates clearly the object of this invention and the results achieved by the practice of simultaneously administering Nystatin and *Torulopsis tropsis* with the antibiotic used for treatment plus protection of the colon.

Administration of an Antibiotic

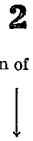

Destruction of intestinal flora

Eventually *Candida albicans* proliferates and becomes virulent

| Plus common yeast | Plus (nystatin plus *Torulopsis tropsis*) |
|---|---|
| Does not stop the proliferation of the *Candida albicans*. | Nystatin destroys the pathogenic yeasts, while the *Torulopsis tropsis* reinseminates the colon with a healthy flora. |

The compositions of this invention prevent the development of pathogenic yeasts, latent in the colon, such as *Candida albicans* which may cause candidiasis such as colitis, stomatitis, cystitis, onyxis, etc. The *Torulopsis tropsis* may be conveniently administered in combination with Nystatin in suitable dosage unit form, such as in a suspension or after lyophilization or desiccation, as a pill, ampule, capsule, powder or suppository, containing 50 to 125 mg. of Nystatin and $10^5$ to $10^{10}$ cells of *Torulopsis tropsis*.

In accordance with this invention, *Torulopsis tropsis* having the property of being resistant to the antifungal Nystatin is administered simultaneously with the Nystatin during the treatment with antibiotics. This simultaneous administration may be conveniently achieved by oral administration of a dosage unit form containing both Nystatin and *Torulopsis tropsis*. Accordingly, in the treatment of mammals with antibiotics, destruction of beneficial flora in the colon is avoided by such administration. Nystatin destroys the pathogenic yeasts and the *Torulopsis tropsis* reinseminates the colon with sound flora.

Examples of mammals in addition to man are horses, cattle, dogs, cats and sheep.

The treatment of a mammal is illustrated by the administration of the Nystatin and *Torulopsis tropsis* to a calf of about 40 kilos having an intestinal infection. Simultaneously, 1 gram of Kannamycin, 125 mg. of Nystatin and $10^6$ to $10^{10}$ cells of *Torulopsis tropsis* are administered orally to the calf twice, a day. The treatment is repeated until the infection has cleared. Tetracycline, colimycin and streptomycin are other examples of antibiotics with which the compositions of this invention comprising Nystatin and *Torulopsis tropsis* are especially useful. The compositions of this invention comprising Nystatin and *Torulopsis tropsis* are not used as antibiotics but are administered to the mammal to act as a "super yeast" capable of reseeding a sterilized intestine in a situation in which other yeasts do not act. Neither Nystatin alone nor *Torulopsis tropsis* alone operates to produce the new result achieved. Both components are essential.

The compositions of the invention may be administered to a man in the proportion of 125 mg. of Nystatin and $10^6$ to $10^{10}$ cells of *Torulopsis tropsis* in a single dose, jointly contained in a capsule, tablet or suppository. For example, two doses of a capsule containing 125 mg. of Nystatin and $10^8$ cells of *Torulopsis tropsis* may be administered during a 24 hour period. The doses to be given are calculated for a man weighing 70 kilos, the medicament being used in proportion to the weight of the patient. In veterinary practice, for instance, the average dose for a dog is 12.5 mg. of Nystatin and $10^5$ to $10^9$ cells of *Torulopsis tropsis*. Sheep, cats and other mammals may receive similar treatment, the doses being calculated in proportion to the weight.

For a mammal such as man, the proportions or amounts of Nystatin and *Torulopsis tropsis* are conveniently:

as single dosage: 50 to 125 mg./$10^6$ to $10^{10}$ cells of *Torulopsis tropsis*
as daily basis: 200 to 700 mg./$10^7$ to $10^{11}$ cells of *Torulopsis tropsis*

Such dosage unit forms may be administered orally. *Torulopsis tropsis* may be produced by the method described in French Pat. No. 1,401,389 of P. R. Barbier.

A more comprehensive understanding of this invention is obtained by reference to the following examples:

EXAMPLE I 100 mg. (50,000 I.U.) of Nystatin at 5000 I.U./mg. are mixed with 6 mg. of dried fecula and 4 mg. of magnesium stearate. The mixture is granulated with ethyl alcohol and dried and then gauged and compressed. The thus obtained compressed tablet of 110 mg. is placed in a capsule. 85 mg. of dry yeast (*Torulopsis tropsis*) mixed with casein filling (q.s.p. one capsule) are added to fill the capsule or other pharmaceutical form.

The composition may be made in the form of a suspension, powder, tablet, ampule, suppository or other dosage unit forms by conventional techniques.

The activity of the composition in mammal or human therapy is controlled by an examination of stools by a stool culture test conducted after the fourth or even the seventh day of treatment.

The procedure of the stool test is as follows:

To a gelose of the Sabouraud type, there are added per ml. 100 mg. of Nystatin and 500 mg. of Kannamycin. This medium is inseminated with a drop of dilution of stools in distilled sterile water. After a few days of culture at 20° C., colonies of *Torulopsis tropsis* cells appear in the mixture to the exclusion of all other microorganisms.

EXAMPLE II

Desirably, the compositions of this invention may be administered in any convenient dosage unit form such as a suspension, powder, tablet, capsule, ampule or suppository. This may be achieved by conventional procedures. The compositions may be combined with pharmaceutically acceptable carriers. The antibiotic, such as Kannamycin, which is to be administered and the usual undesirable effects of which this invention successfully combats may be incorporated in the compositions of this invention. The compositions may also be prepared in the form of tablets, each of them containing:

Nystatin=100 mg.
*Torulopsis tropsis*=$10^6$ cells
Excipient=q.s. for one tablet or in the form of suppositories containing:

Nystatin=125 mg.
*Torulopsis tropsis*=$10^{10}$ cells
Excipient=q.s. for one suppository of 3 g.

The following is another tablet formulation of the compositions of this invention:

|  | Mg. |
|---|---|
| Mixture in proportion of 125 mg. of Nystatin to $10^6$ to $10^{10}$ cells of *Torulopsis tropsis* | 30 |
| Lactose | 50 |
| Starch | 85 |
| Ethyl cellulose 5% solution | 15 |
| Talc | 18 |
| Magnesium stearate | 2 |
| Total | 200 |

The mixture of Nystatin and *Torulopsis tropsis* is uniformly mixed with lactose and a portion of the starch (25 mg.). The binder, ethyl cellulose, is prepared by making a 5% solution in anhydrous ethyl alcohol. The mixture containing the Nystatin and *Torulopsis tropsis* is granulated with the ethyl cellulose solution. Anhydrous ethyl alcohol may be added at this stage to obtain satisfactory wet granules. The whole is wet screened through an appropriate size screen, for example #8 stainless steel screen, and the granulations are dried at room temperature. The composition is then dry screened through a #20 stainless steel screen. The remaining starch, talc, and magnesium stearate are incorporated by mixing thoroughly with the other ingredients. The resulting product is then incorporated into tablets.

EXAMPLE III

As described in Example I, capsules are a convenient dosage form. Hard and soft gelatin capsules are used. Usually the active material Nystatin and *Torulopsis tropsis* is mixed with a suitable quantity of lactose until uniform and the capsules are either filled by hand or by suitable machinery.

An alternate suitable capsule formula is as follows:

|  | Mg. |
|---|---|
| Mixture in proportion of 125 mg. of Nystatin and $10^6$ to $10^{10}$ cells of *Torulopsis tropsis* | 30 |
| Lactose q.s. to | 300 |

What is claimed is:

1. A method of protecting the intestinal flora of a mammal during the administration of a microbiocidally effective amount of an antibiotic which comprises administering simultaneously to said mammal Nystatin and *Torulopsis tropsis* in the proportion of 50 to 125 mg. of Nystatin to $10^5$ to $10^{10}$ cells of *Torulopsis tropsis*.

2. The method of protecting the intestinal flora of a mammal in accordance with claim 1 in which the total daily dose of Nystatin to *Torulopsis tropsis* in the proportion of 200 to 700 mg. of Nystatin to $10^7$ to $10^{11}$ cells of *Torulopsis tropsis*.

References Cited

UNITED STATES PATENTS 3,262,864  7/1966  Kouchner _____ 424—93

FOREIGN PATENTS 1,401,389  4/1964  France.

OTHER REFERENCES

Chemical Abstracts I, vol. 64 (1966), p. 8825b.
Chemical Abstracts II, vol. 65 (1966), p. 5918d.
Pelczar et al., "Microbiology," McGraw-Hill Book Co. (1958), p. 498.

ALBERT T. MEYERS, Primary Examiner
V. D. TURNER, Assistant Examiner

U.S. Cl. X.R.
424—120